(12) United States Patent
    Corcoran

(10) Patent No.: US 7,899,160 B2
(45) Date of Patent: Mar. 1, 2011

(54) METHOD AND SYSTEM FOR PROVIDING CONFIGURABLE APPLICATION PROCESSING IN SUPPORT OF DYNAMIC HUMAN INTERACTION FLOW

(75) Inventor: Christopher J. Corcoran, Colorado Springs, CO (US)

(73) Assignee: Verizon Business Global LLC, Ashburn, VA (US)

( * ) Notice: Subject to any disclaimer, the term of this patent is extended or adjusted under 35 U.S.C. 154(b) by 1581 days.

(21) Appl. No.: 11/210,512

(22) Filed: Aug. 24, 2005

(65) Prior Publication Data

US 2007/0064884 A1    Mar. 22, 2007

(51) Int. Cl.
    *H04M 1/64*    (2006.01)
    *G06F 17/00*   (2006.01)
(52) U.S. Cl. .................................... 379/88.01; 715/239
(58) Field of Classification Search ... 379/88.01–88.28; 715/239
    See application file for complete search history.

(56) References Cited

U.S. PATENT DOCUMENTS

| | | | | |
|---|---|---|---|---|
| 6,269,336 B1 * | 7/2001 | Ladd et al. | ................... | 704/270 |
| 7,242,752 B2 * | 7/2007 | Chiu | ....................... | 379/88.04 |
| 7,430,510 B1 * | 9/2008 | De Fabbrizio et al. | ...... | 704/275 |
| 2005/0028085 A1 * | 2/2005 | Irwin et al. | .................. | 715/513 |

* cited by examiner

*Primary Examiner*—Fan Tsang
*Assistant Examiner*—Solomon Bezuayehu

(57) ABSTRACT

An approach provides machine and a human user interaction in support of dialog flows. A first state file is generated and specifies a plurality of states of a dialog with the human user. The first state file includes logic for transitioning among the states. A second state file is also generated. The second state file specifies a plurality of states of the dialog and includes logic for transitioning among the states, wherein a common process is utilized to interpret the first state file and the second state file. The common process loads one of the state files and determines an appropriate one of a plurality of resources to populate with data associated with the dialog.

28 Claims, 6 Drawing Sheets

METHOD AND SYSTEM FOR PROVIDING CONFIGURABLE APPLICATION PROCESSING IN SUPPORT OF DYNAMIC HUMAN INTERACTION FLOW

FIELD OF THE INVENTION

The present invention, according to various embodiments, relates to human-machine interaction, and more particularly, to providing configurable application processing.

BACKGROUND OF THE INVENTION

Computing systems continue to evolve to provide increasingly sophisticated applications involving interactions with human users. One important area is that of call processing. Given the many diverse, advanced telecommunication services, the complexity of call processing systems has become burdensome. Upon receipt of a call, such systems generally entail presenting a caller with a menu of options for data collection and subsequent processing of the call. The call is connected to a particular application and analyzed such that resources required to process the call can be assembled. Different applications require programmers to write and test code that are specific to those applications (i.e., custom code for each application). Additionally, if different data is required for the application, such code would need to be rewritten. This process is inefficient and costly.

Based on the foregoing, there is a clear need for an approach that facilitates the interaction with a human user in support of a computing application (e.g., call flow).

SUMMARY OF THE INVENTION

These and other needs are addressed by the present invention, in which an approach for providing application flow control using state files is disclosed.

According to one aspect of the present invention, a computer-implemented method for interacting with a human user is disclosed. The method comprises accessing a first state file that specifies a plurality of states of a dialog with the human user and includes logic for transitioning among the states. The method also comprises accessing a second state file that specifies a plurality of states of the dialog and includes logic for transitioning among the states, wherein a common process is utilized to interpret the first state file and the second state file. The common process loads one of the state files and determines an appropriate one of a plurality of resources to populate with data associated with the dialog.

According to another aspect of the present invention, a system for interacting with a human user is disclosed. The system comprises a memory configured to store a plurality of state files, each state file specifying a plurality of states of a dialog with the human user and including logic for transitioning among the states. The system also comprises a common processor configured to interpret the first state file and the second state file, to load one of the state files, and to determine an appropriate one of a plurality of resources to populate with data associated with the dialog.

According to another aspect of the present invention, an apparatus for interacting with a human user is disclosed. The apparatus comprises means for accessing a first state file that specifies a plurality of states of a dialog with the human user and includes logic for transitioning among the states. Additionally, the apparatus comprises means for accessing a second state file that specifies a plurality of states of the dialog and includes logic for transitioning among the states. A common process is utilized to interpret the first state file and the second state file, the common process loading one of the state files and determining an appropriate one of a plurality of resources to populate with data associated with the dialog.

According to yet another aspect of the present invention, a computer-implemented method for supporting a call flow with a human user is disclosed. The method comprises receiving a request from a voice browser in support of the call flow. The method also comprises loading one of a plurality of state files in response to the request, wherein the state files correspond to a plurality of states of the call flow and specify rules for the call flow. Each of the state files includes logic for transitioning among the states. Also, each of the state files is associated with a markup language file specifying a script for the call flow, wherein the markup language file receives data from the respective state file based on state of the call flow.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for configurable application flow control using state files are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
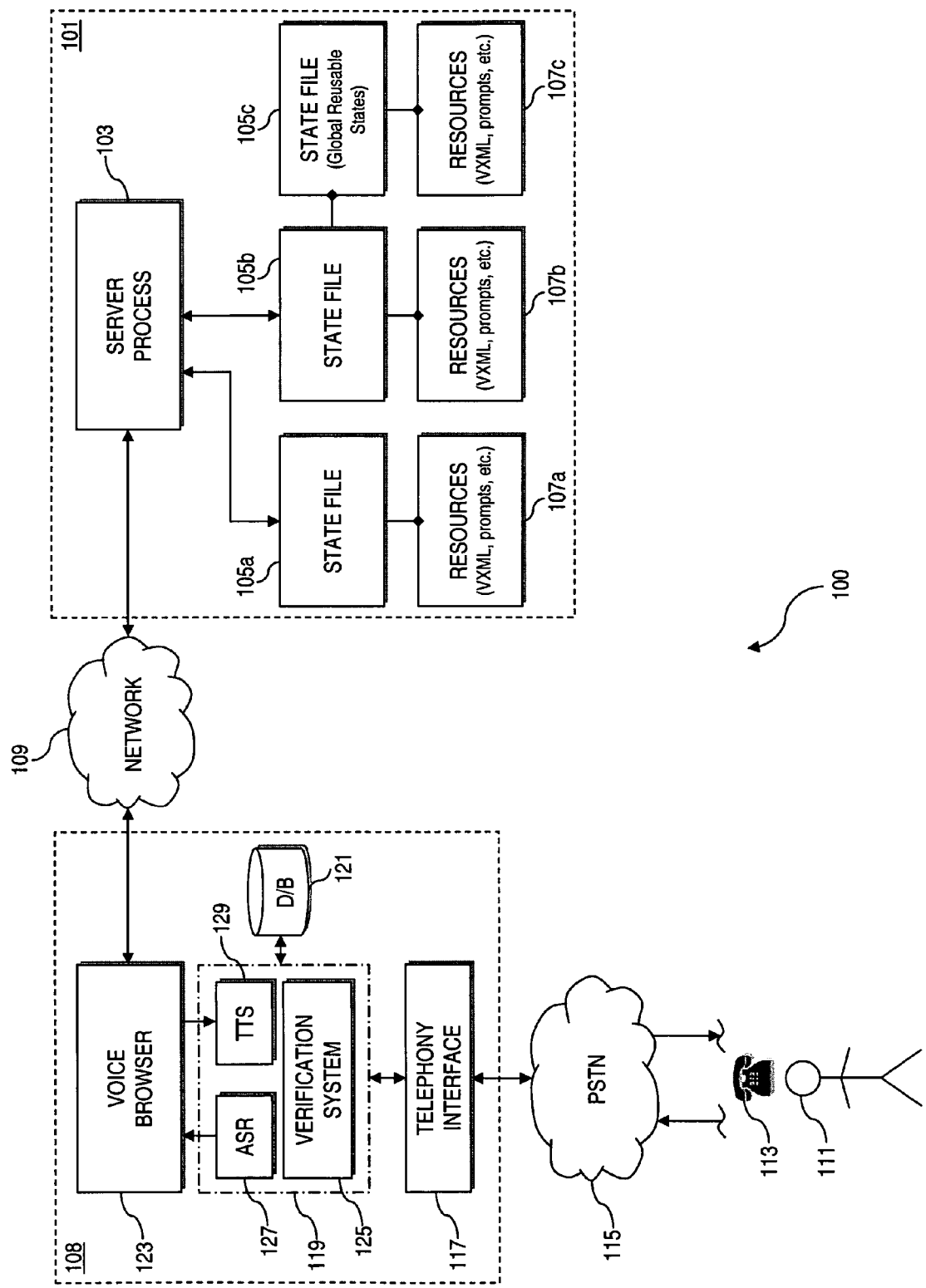
FIG. 1 is a diagram illustrating a communication system capable of providing a speech-enabled call application system utilizing state files to control dialog flow, in accordance with an embodiment of the present invention.

FIG. 1 is a diagram illustrating a communication system capable of providing a speech-enabled call application system utilizing state files to control dialog flow, in accordance with an embodiment of the present invention. A communication system 100 includes a speech application system 101 that utilizes a server process, e.g., StateMap servlet, 103 for interfacing with one or more state files 105a-105c. In an exemplary embodiment, the state files are eXtensible Markup Language (XML) files, and can be referred to as "StateMap XML." Each of the state files 105a-105c has a corresponding resource 107a-107c, which can be a VoiceXML file, prompts, scripts, etc. The speech application system 101 can support a myriad of applications involving interaction with a human user, such as call flow processing and web survey applications (as explained in FIG. 5). By way of example, the speech application system 101 interfaces with a voice portal system 108 over a transport network 109. The transport network 109 can be a data network, a circuit-switched network, or a combination thereof.

As shown, a user 111 can access the voice portal system 108 from a telephone 113, or other any other device capable of providing telephony communication (e.g., mobile phone or terminal, etc.) over, for instance, a public switched telephone network (PSTN) 115. Alternative embodiments may enable users 111 to interact with the voice portal system 108 via a packet switched data network (PSDN) or voice-over-internet protocol (VoIP) connection by way of computer, workstation or other device (e.g., personal digital assistant (PDA), etc.), supporting microphone and speaker functionality.

In this example, the voice portal system 108 comprises, for example, a telephony interface 117, a resource manager 119, a voice recognition database 121, and a voice browser 123. The voice portal system 108 utilizes the telephony interface 117 for communicating with the user 111 over a telephony network, such as the PSTN 115. It is noted that other interfaces can be utilized depending on the access method of the user 111. Although these components within the voice portal system 108 are shown as separate entities, the voice browser 123 can incorporate some or all of the functionalities of the voice portal system 108 into a single network element. Furthermore, although only a single voice browser 123 is shown, it is recognized that multiple voice browsers 123 may be deployed—e.g., one for each user 111 communicating within the system 100.

The resource manager 119 provides various speech resources, such as a speaker verification system 125, an automatic speech recognizer (ASR) 127, and a text-to-speech engine (TTS) 129. Also according to one embodiment of the present invention, the resource manager 119 includes an analog-to-digital and digital-to-analog converter (not shown) for signaling between the telephone 113, for example, and the voice browser 123. The automatic speech recognizer 127 converts a user's 105 spoken language (represented by analog signals) into textual form (digital signal) for processing by the voice browser 123 while the text-to-speech engine 129 converts textual information (digital signal) from the voice browser 123 to speech (analog signal) for playback to a user 111. Alternatively, the voice browser 123 may play pre-recorded sound files to a user 111 in lieu of, or in addition to, use of the TTS engine 129.

The speaker verification system 125 provides an unobtrusive level of security for the voice portal system 108. In this manner, limited access can be achieved by positively identifying and screening users 111 based on their voice prints. Thus, the speaker verification system 125 can keep sensitive transactions secure without requiring a user 111 to enter an identification number or other type identification code and password.

The voice browser 123 functions as the gateway between a call, for example, and a variety of networked applications, e.g., the configurable speech-enabled call application system 101. While directly analogous to an ordinary web server, the voice browser 123 can employ a microphone, keypad, and a speaker instead of a keyboard, mouse, and monitor of a conventional web system. The voice browser 123 processes pages of markup language, such as voice extensible markup language (VoiceXML), speech application language tags (SALT), hypertext markup language (HTML), and others such as wireless markup language (WML) for wireless application protocol (WAP) based cell phone applications, and the World Wide Web (W3) platform for handheld devices, residing on a server (not shown). Since a broad level of markup languages are supported, the voice browser 123 can be configured accordingly, to include a VoiceXML-compliant browser, a SALT-complaint browser, an HTML-compliant browser, a WML-complaint browser or any other markup-language complaint browser, for communicating with the user 111. As with standard web services and applications, the voice browser 123 can utilize a standardized networked infrastructure, i.e., hypertext transport protocol (HTTP), cookies, web caches, uniform resource locators (URLs), secure HTTP, etc., to establish and maintain connections.

In one embodiment of the present invention, the voice browser 123 enables the user 111 to speak and listen to a speech-enabled call application through the StateMap servlet 103 over, for example, the transport network 109, which can be a standard public or private network (e.g., the Internet, a local area network (LAN), a wide-area network (WAN), and/or a wireless network). In order for the voice browser 123 to understand the textual information obtained from the ASR 127, the voice browser 123 accesses the ASR 127, which in turn, retrieves information from the recognition database 121. In an exemplary embodiment, the database 121 stores dictionary files, grammar files, acoustic model sets, and natural language definitions. Dictionary files contain phonetic pronunciations for words used in grammar files while grammar files themselves describe a set of phrases that the speech-enabled application can consider during the recognition process. The acoustic model set defines, among other things, the languages that an application will use whereby models differ in their accuracy, memory requirements, and computational requirements. By accessing the recognition database 121, the ASR 127 can understand and process valid user utterances. In alternative embodiments, the voice browser 123 may contain speech recognition logic (not shown) that extracts meaning from the user's spoken utterances directly.

While only one recognition database 121 is shown, it is recognized that multiple databases may exist controlled by, for instance, a database management system (not shown). In a database management system, data is stored in one or more data containers, each container contains records, and the data within each record is organized into one or more fields. In relational database systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

To establish a connection with the voice browser 123, the user 111 dials a telephone number assigned to the voice portal system 108. When the voice browser 123 is engaged in a conversation with the user 111, the voice browser 123 requests, receives, and evaluates pages of dynamically generated markup language, e.g., VoiceXML, residing on an ordinary server (not shown). In an exemplary embodiment of the present invention, the server process 103 runs a StateMap servlet 103 to process state files 105a-105c, which govern what the voice browser 123 will prompt or communicate to the user 111 and also the expected responses from the user 111. As the conversation proceeds, the voice browser 123 exchanges information with the StateMap servlet 103 that dynamically generates new pages of markup language for interaction with the user 111. The dialog or conversation ends when either the user 111 hangs up, or when the last page of markup language directs the voice browser 123 to disconnect the call.

As mentioned, the StateMap servlet 103 provides a mechanism for controlling the dialog flow involving the resources 107a-107c (e.g., VoiceXML documents) of the speech-enabled application system 101. The state files 105a-105c, according to one embodiment of the present invention, are XML-based scripts for controlling the back-end flow of a conversation; namely, the state files 105a-105c determine or specify the "state" of the dialog as well as transition to other states. That is, each of the state files 105a-105c contains control logic that acts on collected parameters to govern the states of the dialog. The StateMap servlet 103 interprets a configurable state file 105a, for example, to determine what data needs to be passed to the resource portion 107a to dynamically adapt to and advance the conversation with a user 111. Because the state files 105a-105c are fully configurable and immediately effective without need of recompiling and/or restarting, global reusable states (as in state file 105c) can be defined; these reusable states can make use of global resources (e.g., resources 105c) and be incorporated and referenced by any state file (e.g., 105a or 105b) to control the flow of the dialog with the user 111.

Figure 2:
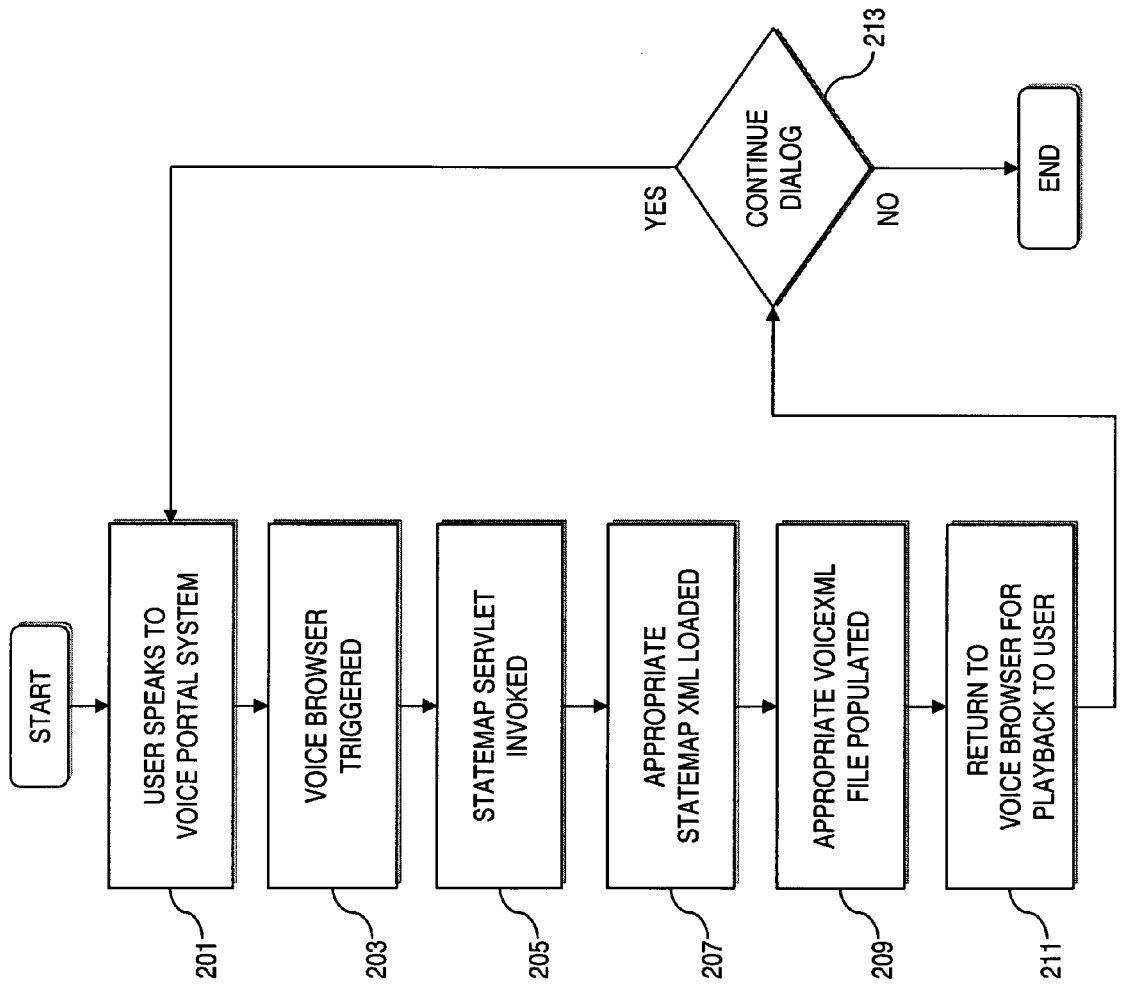
FIG. 2 is a flowchart of a process for utilizing state files within the system of FIG. 1, in accordance with an exemplary embodiment of the present invention.

FIG. 2 is a flowchart of a process for utilizing state files within the system of FIG. 1, in accordance with an exemplary embodiment of the present invention. In an exemplary dialog, the user 111 accesses the voice portal system 108, over, for example, a PSTN 115 connection using the telephone 113, by dialing phone number corresponding to the voice portal system 108 and speaking to the voice portal system 108 (step 201). The speaker verification system 125 verifies the user's voice, and the ASR 127 converts the user's analog voice signal into digital textual information, triggering a voice browser 123 to enable user interaction, as in step 203.

Once triggered, the voice browser 123 extracts meaning from the user's spoken utterance using either the ASR 127 or its own speech recognition logic (not shown). Based on the browser's understanding, the browser 123 will request, in this example, VoiceXML scripts over a data connection established by the transport network 109 (i.e., the Internet) from the StateMap servlet 103, thereby invoking the StateMap servlet 103 (step 205). The StateMap servlet 103 then loads, per step 207, the appropriate state file (e.g., state file 105a), which in turn provides the dialog flow configuration rules for the conversation. In addition, by loading the state file 105a, the StateMap servlet 103 is able to determine the first state for the application 103. Based on this first state, the StateMap servlet 103 populates the appropriate resource (e.g., VoiceXML file), per step 209.

Once populated, the StateMap servlet 103 forwards the populated VoiceXML textual information to the voice browser 123 for playback to the user 111 (step 211). Depending on whether the populated file is a pre-recorded prompt or a dynamically created response, the voice browser 123 can, respectively, directly playback a pre-recorded sound file to the user 111 or send the textual information to the TTS 129 for conversion into cognizable speech for playback. According to the dialog configuration rules stored within the loaded state file 105a, the voice browser 123 can either continue the conversation or disconnect the call (step 213). If the conversation proceeds, the process repeats, whereby the voice browser 123 can exchange information with the StateMap servlet 103; the servlet 103 in turn dynamically generates new pages of markup language for interaction with the user 111. If the conversation ends, either because the user 111 hangs up or the last page of markup language directs the voice browser 123 to terminate, the call is disconnected.

Figure 3:
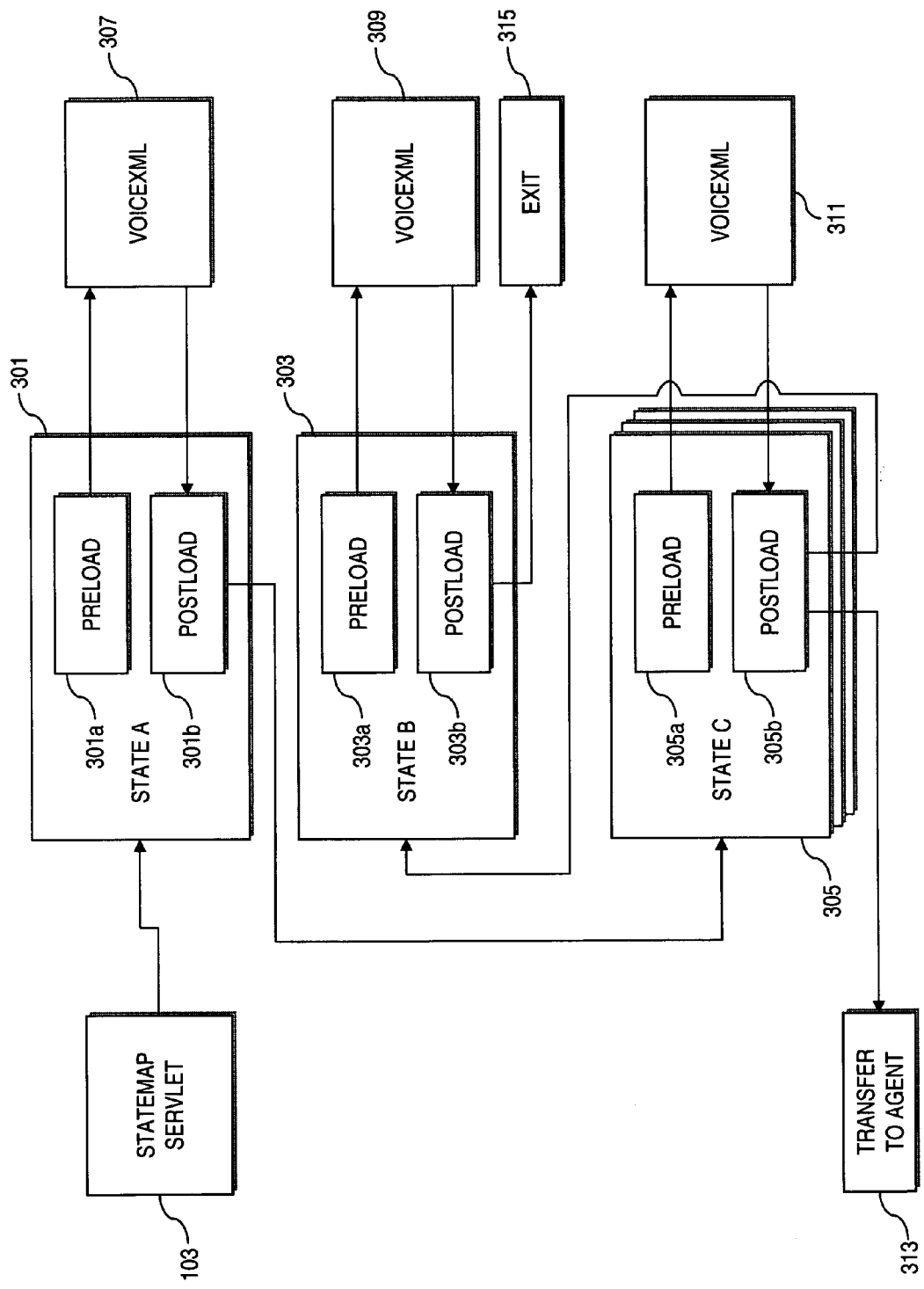
FIG. 3 is a diagram an exemplary structure of state files interacting with a server process, according to an embodiment of the present invention.
Figure 4:
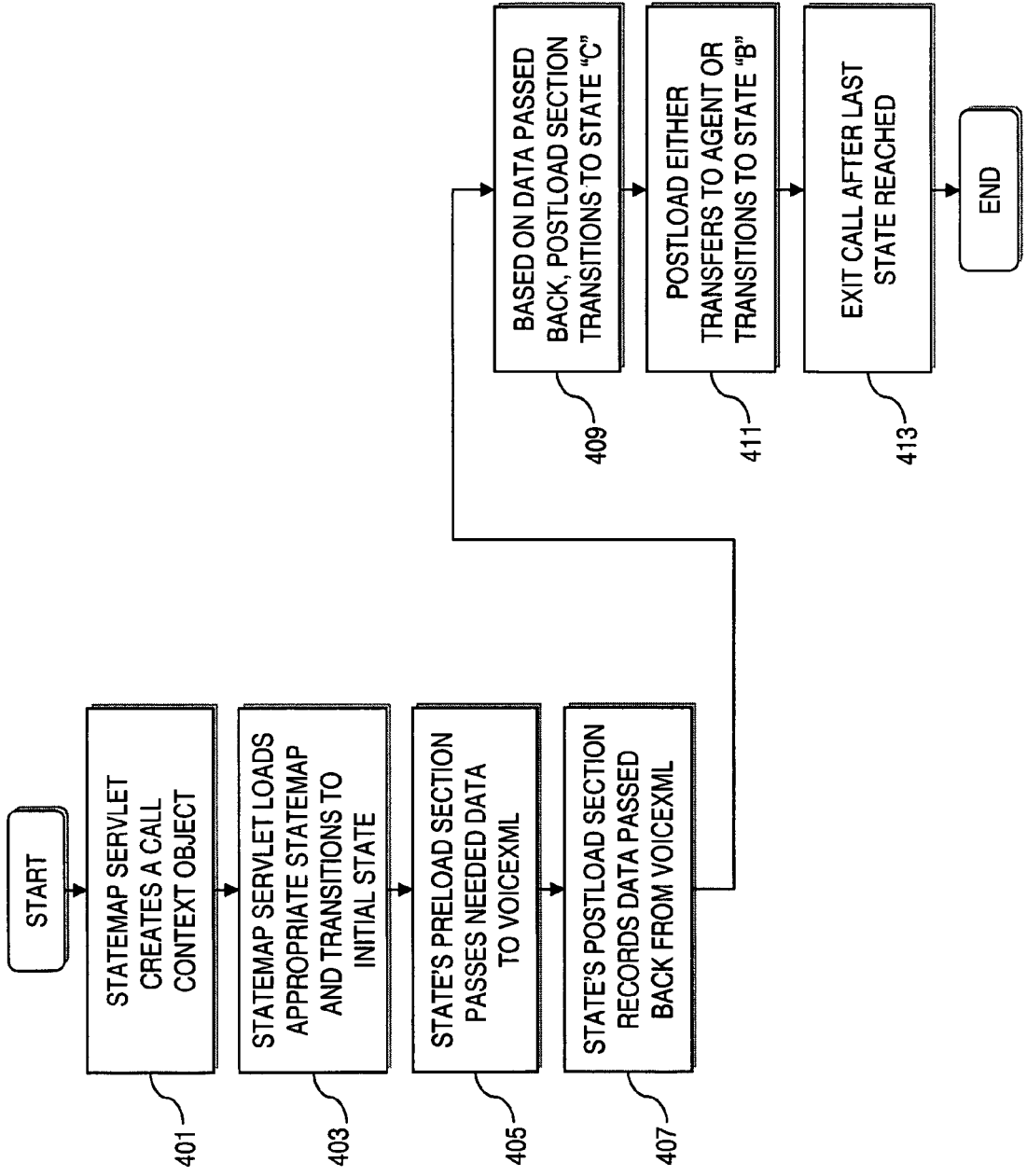
FIG. 4 is a flowchart of a call flow utilizing the state file structure of FIG. 3, in accordance with one embodiment of the present invention.

FIGS. 3 and 4 describe an exemplary call flow and the supporting state files, according to an embodiment of the present invention. For the purposes of illustration, the call flow is supported by a servlet and voice XML files. When a new call invokes a StateMap servlet 103 (of FIG. 1), a call context object (not shown) is created, as in step 401. The call context object, for example, is where collected user data for a call resides. For a state file 301, 303 and 305 to prepare a call context object, user variables can be initialized as follows:

```
<init>
    <declareVariable name="webTimeout" value="5000" />
    <!-- milliseconds -->
    <declareVariable name="validate_cust_acct_iterations"
    value="0" />
</init>
```

It is contemplated that any variable can be added to the call context object, and that certain variables are "special" context variables that cannot be set manually, but only referenced. One such exemplary variable is "status," which is reflected within the call context object as ${status}. In StateMap XML applications, the resources (e.g., VoiceXML documents) 307, 309 and 311 passes such a "status" parameter as part of a StateMap servlet request. The value of status may be "valid," "non-valid" or any other parameter value depending on the application. The status variable reflects the last status passed in through the StateMap servlet request.

In the statePortalProperties.xml file, a speech-enabled application attribute called the subapp name can optionally be defined, as reflected in the call context object under the special name, ${subappname}. The subappname is a way of associating a speech-enabled application with a particular lightweight directory access protocol (LDAP) user.

By way of example, another special variable is ${properties}. Since StateMap applications can use XML property files instead of the more antiquated ".properties" files, the properties variable is used to reference a specific application attribute. The StateMap name attribute can be unique and can match the name used in the statePortalProperties.xml file. Additionally, use of the XML property interface entails the specifying of properties within the markup file, i.e., only attribute name-value pairs can be used as apposed to freeform body content. The following properties file can be assumed:

```
<properties name="abcd" dynamicReload="true">
    <timeouts defaultTimeout="5">
        <oneTimeout name="get_fee" maxWait="3" />
        <oneTimeout name="process_cc" maxWait="20" />
    </timeouts>
</properties>
```

A particular property can be referenced within a StateMap, for example:

```
<log message="Default Timeout:
${properties.timeouts.defaultTimeout}" />
<log message="Max Wait:
${properties.timeouts.oneTimeout.maxWait}" />
```

There are two "oneTimeout" sections in this property file. In these cases, the processed value can be the first one referenced within the file. In this particular case, the "maxWait" value of "3" gets referenced. Assuming the "maxWait" associated with the second "oneTimeout" section is desired, a reference could be modified to be more specific to collect this property, for example:

```
<log message="${properties.timeouts.oneTimeout
     [name=process_cc].maxWait}"/>
```

However, developers and programmers are not confined to referencing properties associated only within their own application. A StateMap can reference any XML based property on the system. The properties name (as defined on the first line of the file) can be used to more fully qualify a properties reference. For instance, a non-"abcd" StateMap can reference the above property like so:

```
<log message="${properties[abcd].timeouts.oneTimeout[name=
     process_cc].maxWait}"
     />
```

The property references can start with "properties" and end with an XML attribute name. In an exemplary embodiment, any number of XML tag names can exist in between. If the property does not exist, a warning message can be logged and an empty string can be returned. There are also properties that begin with "special:" corresponding to general application or call specific variables. A list of predefined "special:" properties and their meanings can be referenced within Table 1.

TABLE 1

| Property | Meaning |
| --- | --- |
| ${special:hostName} | The local box hostname. |
| ${special:user} | The LDAP user associated with this application. |
| ${special:org} | The LDAP organization associated with this application. |
| ${special:appName} | The application name that used as the name attribute in the first line of a properties file or StateMap. It is also the application name as defined in the statePortalProperties.xml file. |
| ${special:subAppName} | This is the sub application name that is defined (optionally) in the statePortalProperties.xml file. |
| ${special:isProduction} | Boolean to indicate whether the application is currently running on a production box. This is value is specified, on a hostname basis, in the localProperties.xml file. |
| ${special:isTest} | Boolean to indicate whether the application is currently running on a test box. This is value is specified, on a hostname basis, in the localProperties.xml file. |

TABLE 1-continued

| Property | Meaning |
| --- | --- |
| ${special:isCustomerFacing} | Boolean to indicate whether the application is currently running on a customer facing box. Keep in mind that a test box may be customer facing and a production box always is. This is value is specified, on a hostname basis, in the localProperties.xml file. |
| ${special:date} | The current date of the local platform in M/D/YYYY format. Daylight savings adjustments are determined by local platform. |
| ${special:dateEST} | The current Eastern timezone date in M/D/YYYY format. Daylight savings adjustments are determined by local platform. |
| ${special:dateCST} | The current Central timezone date in M/D/YYYY format. Daylight savings adjustments are determined by local platform. |
| ${special:dateMST} | The current Mountain timezone date in M/D/YYYYformat. Daylight savings adjustments are determined by local platform. |
| ${special:datePST} | The current Pacific timezone date in M/D/YYYY format. Daylight savings adjustments are determined by local platform. |
| ${special:time} | The current time of the local platform in HH:mm:ss.mmm format. Daylight savings adjustments are determined by local platform. |
| ${special:timeEST} | The current Eastern timezone time in HH:mm:ss.mmm format. Daylight savings adjustments are determined by local platform. |
| ${special:timeCST} | The current Central timezone time in HH:mm:ss.mmm format. Daylight savings adjustments are determined by local platform. |
| ${special:timeMST} | The current Mountain timezone time in HH:mm:ss.mmm format. Daylight savings adjustments are determined by local platform. |
| ${special:timePST} | The current Pacific timezone time in HH:mm:ss.mmm format. Daylight savings adjustments are determined by local platform. |

In addition, parameters from the HttpServletRequest can be accessed without having to use a collectHttpParam command by using the reference, ${request:paramName}. Similarly, session objects can be accessed by using the reference, ${session:keyName}. However, although request parameters are strings, session parameters can be any object, therefore access to public, zero-argument getters on the object can be accomplished using the dot convention:

| | |
| --- | --- |
| ${request:service.length} | * Strings do have zero-arg length method. |
| ${session:sessionKey.getAniLastName} | * Note that sessionKey is the key for the UserSession. |

After creation of the call context object, the appropriate StateMap XML 301 file is loaded and the StateMap servlet 103 transitions to the initial state, e.g., state A associated with state file 301, for the application (step 403). Although only three states (e.g., state A, state B, and state C) are shown, it is recognized that each state file 301, 303, and 305 can specify any number of states that correspond to a dialog state in a call. Each state (corresponding to state files 301, 303 and 305) can be tied to a VoiceXML file (e.g., files 307, 309 and 311) and includes a preload section (e.g., 301a, 303a, and 305a) and a postload section (e.g., 301b, 303b, and 305b). The preload section is responsible for setting up the data that needs to be passed to the VoiceXML file. The postload section is responsible for interpreting the data passed back from the VoiceXML file, and then based on that interpretation, for deciding which state to transition to next. Each section, whether preload or postload, may contain commands that are responsible for control logic, formatting data, billing, reporting, logging, and an assortment of other call flow related activities.

Each of the VoiceXML documents 307, 309 and 311 defines that particular parameters that need to be initialized before loading the VoiceXML document as well as which parameters need to be collected from that document before transitioning to the next state. Under this scenario, the state file 303 corresponding to state B specifies an Exit condition 315 for the dialog.

An exemplary XML state may be specified as follows:

```
<state name="customerAccountNumber" suffix="-ABCD-
AccountNumber">
    <preload>
    </preload>
    <postload>
    </postload>
</state>
```

In addition, certain "special" states, as the allStates, can be defined and have recurring initialization rules that pass into every loaded VoiceXML document (e.g., 307, 309 and 311). Such special states may resemble the following:

```
<allStates>
    <preload>
        <initVxmlParam name="operator_allowed" defaultValue="n" />
    </preload>
</allStates>
```

Furthermore, a special state may also have a postload section if, for instance, it is desired that the same parameter be collected every time a VoiceXML file passes the user variables back to the special state. It should be noted that this special state can be executed each time, before any other state is executed.

When the StateMap servlet 103 transitions to state A as the initial state for example, the preload section 301a prepares and passes the necessary user data to the corresponding VoiceXML file 307, per step 405. The preload section 301a can copy the data from the call context object as follows:

```
<preload>
    <initVxmlParam name="acct_num_min_digits" />
    <initVxmlParam name="acct_num_max_digits" />
</preload>
```

In the above preload section 301a, state A specifies that the preload section 301a copy the value of "acct_num_min_digits" (Account Number—minimum digits) and "acct_num_max_digits" (Account Number—maximum digits) out of the context and pass it as a replace parameter to the VoiceXML file 307 (step 403). These parameters can accordingly show up as "_ACCT_NUM_MIN_DIGITS_" and "_ACCT_NUM_MAX_DIGITS_". Assuming that a parameter has not yet been defined in the call context object, a default value may be substituted as follows:

```
<initVxmlParam name="acct_num_min_digits"
    defaultValue="5"/>
```

Once the appropriate data is passed to the VoiceXML file 307, the data is processed and a new set of parameters is generated. The postload section 301b then collects the parameters from the StateMap servlet request and places them into the call context object (step 407). The corresponding command to collect parameters and place them in the call context object is as follows:

```
<collectHttpParam name="cust_acct_num"/>
```

Based on the collected parameters (or other call context parameters), the StateMap servlet 103, in conjunction with the loaded StateMap XML file 301, can control the flow of the speech-enabled application. For instance, the postload section 301b can specify the following code:

```
<postload>
    <collectHttpParam name="cust_acct_num" />
    <increment name="acct_retries" />
    <if test="${cust_acct_num} != 1234567">
        <if test="${acct_retries} > 2">
            <exitCall name="badAcctNumber" />
        </if>
        <else>
            <!-- Try Again - Jump to the current state -->
            <gotoState name="collectAcctNum" />
        </else>
    </if>
    <else>
        <log level="debug" message="got good acct number" />
        <gotoState name="mainMenu" />
    </else>
</postload>
```

In the example, the postload section 301b introduces "if" statements. Call context variables are referenced in "if test" statements (and many other places) using the "${ }" ant convention. These references will hereby be referred to as context references as apposed to context variables. Furthermore, by accessing a context variable in terms of the methods of the Java™ object it represents, additional user data may be extracted. These variables can simply be strings. Thus, through an action handler, various user information can be transferred into the application session. Accessing the Java™ methods of a variable is performed though a qualified reference:

```
<log message="foo's class name is ${foo.get-
    Class.getName}"/>
```

Furthermore, interfacing with Java™ code is executed through the StateActionHandler interface (in the com.mci.portals.statemap package). This interface implements the following method:

```
public boolean performAction(CallContext context,
    String action);
```

The action can be an arbitrary string passed along from the state file to identify the particular action that is being performed. In an exemplary embodiment, the call context can hold a hash map of the parameters passed between the VoiceXML and the servlet 103. Additionally, the call context has references to the HttpServletRequest, session and user session. After performing an action, e.g., scraping a website or communicating with a database, the action handler can store any needed data in the call context. This then can be used as a VoiceXML initialization parameter by the state file, as in the following example:

```
package com.mci.portals.test;
import com.mci.portals.statemaps.StateActionHandler;
public class CustDataChecker implements StateActionHandler {
    public boolean performAction( CallContext context, String action ) {
        // Get acct num collected from VXML.
        String acctNum = context.getString( "cust_acct_num" );
        // Check cust database to see if number is valid.
        boolean isValid = validateNum( acctNum );
        context.put( "acctNumStatus" isValid );
        return true; // Everything is good, don't exit call.
    }
}
<!-- Statemap Snippet -->
<postload>
    <collectHttpParam name="cust_acct_num" />
    <!-- performAction will do the check and then set acctNumStatus
        so that the statemap will know what to do next -->
    <performAction
        name="validate_cust_acct"
        handler="com.mci.portals.test.CustDataChecker"
        timeout="5000"
        onTimeout="exit.custWebSiteDown" />
    <if test="${acctNumStatus} == true">
        <gotoState name="mainMenu" />
    </if>
    <else>
        <exitCall name="custAcctNumInvalid" />
    </else>
<postload>
```

If a time timeout is specified, when executing a performAction, then the action can be performed as WorkData to a ThreadManager. One thread manager can be used for multiple StateMap applications. The thread manager can be configurable through the statePortalProperties.xml file and can have its maxWorkThreads bumped occasionally as new state portal applications are added to the overall system.

Table 2, below, details the commands utilized in the above exemplary code.

TABLE 2

| Name | Add |
|---|---|
| Description | Adds two values together. The way the values are added depends on the add type. If no type is specified, then integer is assumed by default. |
| Examples | <add value="1" to="${retryCount}" result="incrementedRetryCount" /><br><add value="${dueAmount}" to="${fee}" type="amount" /><br><add value="1.25" to="${fee}" result="dueAmountWithFee" type="amount"/><br><add value="7" to="${dueDate}" type="date"/><br><add to="This is " value="a test." type="string" result="foo"/> |
| Parameters | value - The value to add.<br>to - The value to add to. If no result is specified, then this can be a context reference and the results can be deposited there.<br>result - The name of the context variable in which to place the addition results. It is noted that a variable reference is used here (i.e., ${bla} instead of bla), it is assumed that the referenced value contains the name of the parameter that the results are to be stored under.<br>type - The type of addition to be performed. Supported types are integer, amount, date, and string. Note that any date value can be specified in the m/d/yyyy format. When executing data arithmetic, the date is specified in the to attribute and the number of days to add are stored in the value attribute. String arithmetic results in the concatenation of the strings in the order to + value. |
| Name | breakupAmount |
| Description | Takes an amount of name 'x' and breaks it down into separate x_thousands, x_hundreds, x_dollars and x_cents context variables. Each broken out field is guaranteed to have at least a 0 in it. A context variable, containing a character determining the sign of the amount (either '+', '−', or '0'), is placed in x_sign. |
| Examples | <breakupAmount name="dueAmount" /><br><breakupAmount name="dueAmount" defaultValue="$1.25" /><br><breakupAmount name="dueAmount" defaultValue="225.38" /> |
| Parameters | name - Name of the context variable to breakup.<br>defaultValue - If no such parameter exists, then use this default.<br>format - If set to 'simple', then break up amount into only dollars and cents (i.e., the dollars field is not broken out into thousands, hundreds and dollars) |
| Name | breakupDate |
| Description | Takes a date of name 'x' and parses it into separate x_month, x_day and x_year context variables. Dates can be in the following formats: (m/d/yyyy, m/d/yy, mm/dd/yyyy, mm/dd/yy, m/yyyy, mm/yyyy, m/yy, mm/yy). The parsed dates are normalized so that any zero padding is removed and year are converted to the four digit format. Two digit years are converted to four digit in such a way that years <20 are considered 21st century and other years are considered 20th century. |

TABLE 2-continued

| Name | Add |
|---|---|
| Examples | <breakupDate name="dueDate" /> |
| Parameters | name - Name of the context variable to breakup. |
| Name | breakupNumber |
| Description | Takes an number of name 'x' and breaks it down into separate x_thousands, x_hundreds and x_sub_hundreds context variables. Each broken out field is guaranteed to have at least a 0 in it. |
| Examples | <breakupNumber name="daysTillXmas" /><br><breakupNumber name="daysTillXmas" defaultValue="12" /><br><breakupNumber name="daysTillXmas" defaultValue="${daysLeft}" /> |
| Parameters | name - Name of the context variable to breakup.<br>defaultValue - If no such parameter exists, then use this default. |
| Name | collectHttpParam (deprecated name: collectParam) |
| Description | Copies the value of a parameter from the HttpServletRequest and places it into a call context variable. Typically, these are among the first lines in a state file's postload section. |
| Examples | <collectHttpParam name="bla" /><br><collectHttpParam name="bla" toName="foo" /><br><collectHttpParam name="bla" defaultValue="6" /> |
| Parameters | name - Name of the parameter to be collect. Note that a variable reference is used (ie. ${bla} instead of bla), it is assumed that the referenced value contains the name of the parameter that is to be collected. If no toName is specified, then the HTTP param name can be used as the context variable name.<br>toName - The name of the call context variable to copy this HTTP param to. If not specified, then the HTTP param name is used.<br>defaultValue - If no such parameter exists, then use this default. |
| Name | declareVariable (deprecated name: setParam) |
| Description | Sets the value of a context variable. |
| Examples | <declareVariable name="bla" value="3" /><br>< declareVariable name="${foo}" value="3" /> <!-- foo contains variable name --> |
| Parameters | name - Name of the variable to be set. Note that if a variable reference is used (ie. ${bla} instead of bla), it is assumed that the referenced value contains the name of the variable to be set.<br>value - The value to set the variable. |
| Name | defaultVariable (deprecated name: defaultParam) |
| Description | Checks for the existance of a variable in the call context and sets it, only if it's not there. |
| Examples | <defaultVariable name="bla" value="0" /> |
| Parameters | name - Name of the variable to be set. Note that if a variable reference is used (ie. ${bla} instead of bla), it is assumed that the referenced value contains the name of the variable to be set.<br>value - The value to set if no previous value exists. |
| Name | Else |
| Description | Execute this block if the previous condition was not met. |
| Examples | <else><br></else> |
| Parameters | none |
| Name | elseIf |
| Description | Execute this block if the previous condition was not met, and this condition is. |
| Examples | <elseIf test="${retryCount} <=3"><br><elseIf test="${retryCount} <=3" mode="test"><br><elseIf notMode="test"> |
| Parameters | See if command. |
| Name | exitCall |
| Description | Terminates the application and, optionally, transfer the call to an operator. This is a call to one of the predefined exits in the exits section. The exit_name can be automatically passed to the failure VXML script so that it can perform any necessary conditionally processing. |
| Examples | <exitCall name="webSiteDown" /> |
| Parameters | name - The exit name as defined in the exits section. If no name is defined, then this may be considered to be a "natural" application exit. |
| Name | Exit |
| Description | Defines an application termination or transfer and associates it with a name that can be referenced throughout the StateMap. This command typically appears in the exits section of the StateMap, but can also be used directly within any state. |
| Examples | <exit name="webSiteDown" tntCodeName="fkncagent9" pcReason="siteerror" pcSubReason="XMLresponseerror" /><br><exit name="maxPaymentMethods" exitCodeName="fkncterm8" pcReason="invalidusderdata" pcSubReason="maxpaymentmethodattempts" /> |

TABLE 2-continued

| Name | Add |
|---|---|
| Parameters | name - Unique (application level) name to identify this particular mode of exiting.<br>tntCodeName - The tnt code to be used for a transfer.<br>tntNumber - The tnt number to outpulse during a transfer.<br>pcReason - Termination/transfer reason code.<br>pcSubReason - Termination/transfer sub reason code.<br>reportStatus - Report status to use if this exit is taken. If this is anything other than 'Agent', then TNT may not be properly handled on transfers. This is typically used for terminations. |
| Name | generateBillingEvent |
| Description | Generates a billing event, using the billing name listed in the statePortalProperties.xml file or the one specified in billingName, if available. Billing events only get processed on production platforms. |
| Examples | <generateBillingEvent /><br><generateBillingEvent billingName="TCI_324214_KUH_CHING" /> |
| Parameters | billingName - The billing name to use for this event, value found in the statePortalProperties.xml file. |
| Name | gotoState |
| Description | Preload a state and serve up its VXML. |
| Examples | <gotoState name="nextState" /> |
| Parameters | name - The name of the state to transition to. |
| Name | If |
| Description | Execute this block if one or more conditions are met. |
| Examples | <if test="${bla} > 2"><br><if test="${bla} != 2" mode="test"><br><if test="${bla} >= 2" mode="test" notMode="production"><br><if test="${bla} == 2" notMode="production\|quickstart"><br><if test="${bla}=2" notMode="production"><br><if test="${bla} != null && ${foo} < 8"><br><if mode="test\|phase2Feature"><br><if notMode="test"> |
| Parameters | test - A condition that can be met for this block to execute. Use '${ }' to denote context references. Comparison operators include: '==', '!=', '<=', '>=', '<', '>'. A single equals may also be used in place of a double equals. Numbers are evaluated numerically where possible (i.e. both strings are less than 10 characters, exluding sign, and contain only digits), otherwise a string comparison is performed. Unresolved context references and null keywords are treated as empty strings. And (&&) and Or (\|\|) operations are permitted but they cannot be mixed in the same test statement.<br>mode - Only execute this block if the application is in any of the modes listed here. Multiple modes are separated by vertical bars.<br>notMode - Only execute this block if the application is not in any of the modes listed here. Multiple modes are separated by vertical bars. |
| Name | Increment |
| Description | Increments a numeric call context variable. If the variable does not exist in the context, then assume that it's zero before incrementing it. |
| Examples | <increment name="bla" /><br><increment name="bla" value="5" /><br><increment name="bla" value="-5" /><br><increment name="bla" value="${myIncValue}" /> |
| Parameters | name - The name of the variable to be incremented.<br>value - The amount desired to increment by (defaults to +1). |
| Name | initVxmlParam (deprecated name: initParam) |
| Description | Copies the value of a variable from the call context and use it as a VXML replace parameter, or if a value is provided, use that as the replace parameter. If the variable is a java.util.List, then it is broken down as follows: list variable 'x' can be replaced as 'x_count', 'x_1', 'x_2', 'x_...' through to count. |
| Examples | <initVxmlParm name="bla" /><br><initVxmlParm name="bla" defaultValue="3" /> |
| Parameters | name - Name of the parameter for a variable reference (i.e., ${bla}) that the referenced value contains the name to replace.<br>value - The value to place in the VXML<br>defaultValue - If no value is provided and with this name, then use this default. |
| Name | Log |
| Description | Calls Log.log from com.mci.portals.util. Logging session id can be Automatically set. |
| Examples | <log message="Message logging levels default to LVL_INFO." /><br><log level="error" message="Received error code ${errorCode} from db." /> |

TABLE 2-continued

| Name | Add |
|---|---|
| Parameters | message - The message to be printed. Context variable references may be used in the message string.<br>level - Logging level (debug, warning, error, info, event)<br>hilight - If the display supports ANSI colors, then this can be set to true to give the log message a yellow on blue background. Custom ANSI code can also be used to specify different color of log messages. For instance, the default yellow on blue hilight code is "33;44;1m". Hilight will not occur on customer facing platforms. Exemplary ANSI code include:<br>30 black foreground<br>31 red foreground<br>32 green foreground<br>33 brown foreground<br>34 blue foreground<br>35 magenta (purple) foreground<br>36 cyan (light blue) foreground<br>37 gray foreground<br>40 black background<br>41 red background<br>42 green background<br>43 brown background<br>44 blue background<br>45 magenta background<br>46 cyan background<br>47 white background<br>1 set bold<br>5 set blink<br>7 set reverse video<br>isSensitive - If this is set to true and if running on a customer facing platform, then the numbers in this log message can be replaced with '*'. |
| Name | performAction |
| Description | Executes some Java ™ code. |
| Examples | <performAction name="arbitraryActionName"<br>handler="com.mci.portals.fknc.ValidateABAAction" /><br><performAction name="arbitraryActionName"<br>handler="com.mci.portals.fknc.ValidateABAAction"<br>timeout="5000"<br>onTimeout="exit.webSiteTimeout" /><br><performAction handler="com.mci.portals.fknc.ValidateABAAction" /> |
| Parameters | handler - The fully qualified class name of the class that implements the StateActionHandler interface.<br>name - An arbitrary name that can be used by a handler in determining the type of action to be performed.<br>timeout - The time (in milliseconds) after which this command will give up. If this is set then a thread manager can be used, otherwise the application will block until this method returns.<br>onTimeout - The state to transition to or the exit to execute (prefixed by 'exit.') in the event that the timeout is reached.<br>async - When set to true, the timeout parameters are ignored and this action executes in the background. The StateMap will continue processing concurrently while this action is performed. |
| Name | setReportStatus |
| Description | Explicitly sets the report status for the call. Typical values are "Success", "Agent", "Exit" and "Hangup", but anything is possible. |
| Examples | <setReportStatus status="Success" /> |
| Parameters | status - Status name to report. |
| Name | setReturnState |
| Description | Sets the name of the state to transition to after executing a state chain or after going to a state that doesn't have a gotoState of its own. |
| Examples | <setReturnState name="returnState" /> |
| Parameters | name - Name of the state to be returned to. |
| Name | stateLink |
| Description | Jump to the specified state and then return to the next point in the StateMap if the linked state's VXML returns a 'valid' status.. |
| Examples | <stateLink name="bla" /> |
| Parameters | name - Name of the state to be transitioned to. |

The postload section (e.g., 301b, 303b and 305b) may include mode attributes. A mode is one or more keywords that can be used by conditional statements in a state file (e.g., 301, 303 and 305). For example, a XML <statemap> tag may contain a mode attribute that defines the modes (separated by vertical bars "|") that the application uses. This enables the nature of the speech-enable application to be changed through a single keyword. This capability is particularly advantageous during testing. It can also be useful when a customer specifies a certain function that is to be switched on at a later date. An exemplary mode use is as follows:

```
<postload>
    <collectHttpParam name="cust_acct_num" />
    <if mode="test">
        <!-- Testing, dummy up some data to avoid hitting the server -->
        <declareVariable name="acctNumStatus" value="true" />
    </if>
    <else>
        <!-- Not in test mode, so let's actually contact the customer site -->
        <!-- performAction will do the check and then set
             acctNumStatus so that the statemap will know what
             to do next -->
        <performAction
            name="validate_cust_acct"
            handler="com.mci.portals.test.CustDataChecker"
            timeout="5000"
            onTimeout="exit.custWebSiteDown" />
    </else>
    <if test="${acctNumStatus} == true">
        <gotoState name="mainMenu" />
    </if>
    <else>
        <exitCall name="custAcctNumInvalid" />
    </else>
<postload>
```

The postload mode shown above is a method to "dummy up" server data and switch back and forth between the two data sets by simply adding a mode keyword to the StateMap's top-level element. In practical systems, dummied data can be kept under a "moded" conditional to ensure deletion before a speech-enabled application is switched over to production.

With reference to FIG. 3, based on the postload section 301b of the state file 301 (corresponding to state A) executing dialog flow control rules, the application transitions to state C (step 409). In this example, the state file associated with state C is part of a global StateMap XML file, which includes a chain (or sequence) of reusable global states invoked for collecting common user parameters to many different speech-enabled applications, such as credit card information. The global StateMap XML file is another subset of "special" states called state chains. A state chain, in this instance, is a collection of states that execute until one of those states returns a "non-valid" status.

As depicted within FIG. 3, state chains can be defined in a global StateMap (per state file 305) and are meant to be called from customer oriented application StateMaps. State chains allow access to a subset of dialog object features. For example, a credit card state chain can be specified as follows:

```
<stateChain name="creditCard">
    <stateLink name="cardName" />
    <stateLink name="cardNumber" />
    <stateLink name="expirationDate" />
</stateChain>
```

```
<stateChain name="creditCardWithCVV">
    <stateLink name="cardName" />
    <stateLink name="cardNumber" />
    <stateLink name="expirationDate" />
    <stateLink name="cvv" />
</stateChain>
```

In the above credit card state chain, one state chain object is created for collecting a customer's verification value (CVV), and another is created for an instance when such a variable is not required. In order to call one or the other dialog objects, a state chain might be referenced as follows:

```
<setReturnState name="confirmTransaction" />
<gotoState name="creditCardWithCVV" />
```

Since global states are generalized states for repeated use by multiple speech-enabled applications, these global states are unaware of specific customer applications, and therefore need a return state. The return state is the state the global state transitions to when it completes its execution with either a valid or non-valid status. Global states can control the flow between sub-states. If a valid status is returned, then there is an implicit gotoState to the next stateLink. If a non-valid status is returned or if there are no more state links in the chain, then there is an implicit gotoState to the specified return state. If no return state is specified, then the application can be left "hanging" at the end of the chain.

Continuing with the example, the preload section 305a (associated with state C) transfers necessary user variables into the VoiceXML file 311 for processing, while the postload section 305b collects the processed variables to advance the call to the next state of dialog. In an exemplary embodiment, two possible scenarios exist based on the dialog flow control rules of the postload section 305b: either state C transfers the call out of the speech-enabled application to a human agent 313 or state C transitions to its return state, e.g., state B (step 411).

If state C transitions to its return state, then the preload section 303a of state B will transfer necessary user variables into the VoiceXML file 309 for processing while the postload section 303b will collect the processed variables to advance the call to the next state of dialog. Based on the state B's postload section 303b dialog flow control rules, the application can be terminated since the last state has been reached (step 413).

Before call termination can occur, the speech enabled application needs to "cleanup" the collected and processed user variables. Within the cleanup section, the VoiceXML parameters may be initialized for failure scripting; for example:

```
<cleanup>
    <initVxmlParam name="pcReason" value="callerMessedUp" />
</cleanup>
```

Once the speech-enabled application "cleans up" the call context object, the dialog is ready to be exited, per the Exit condition 315. According to one embodiment of the present invention, two methods for terminating a speech-enabled application are considered. One approach is through the use of an ExitCall command. The other approach is through performAction's onTimeout exception handler. When exiting through an onTimeout, the exit needs to be fully qualified, e.g., exit.custWebSiteDown, so as to distinguish an exiting command from a state transition command. Each StateMap can have an "exits" section associated with it, for example:

```
<exits>
    <exit name="webSiteDown" tntCodeName="fkncagent9"
        pcReason="siteerror" pcSubReason="XMLresponseerror" />
    <exit name="maxPaymentMethods" exitCodeName="fkncterm8"
        pcReason="invaliduserdata"
            pcSubReason="maxpaymentmethodattempts" />
</exits>
```

It is noted that the first exit contains a tntCodeName, whereas the second exit has an exitCodeName. The first exit is a transfer and exit, while the second exit is a simple call termination.

As mentioned, the configurable speech-enabled call application system 101 can utilize StateMaps to control dialog flow to support an array of applications, such as a web survey.

Figure 5:
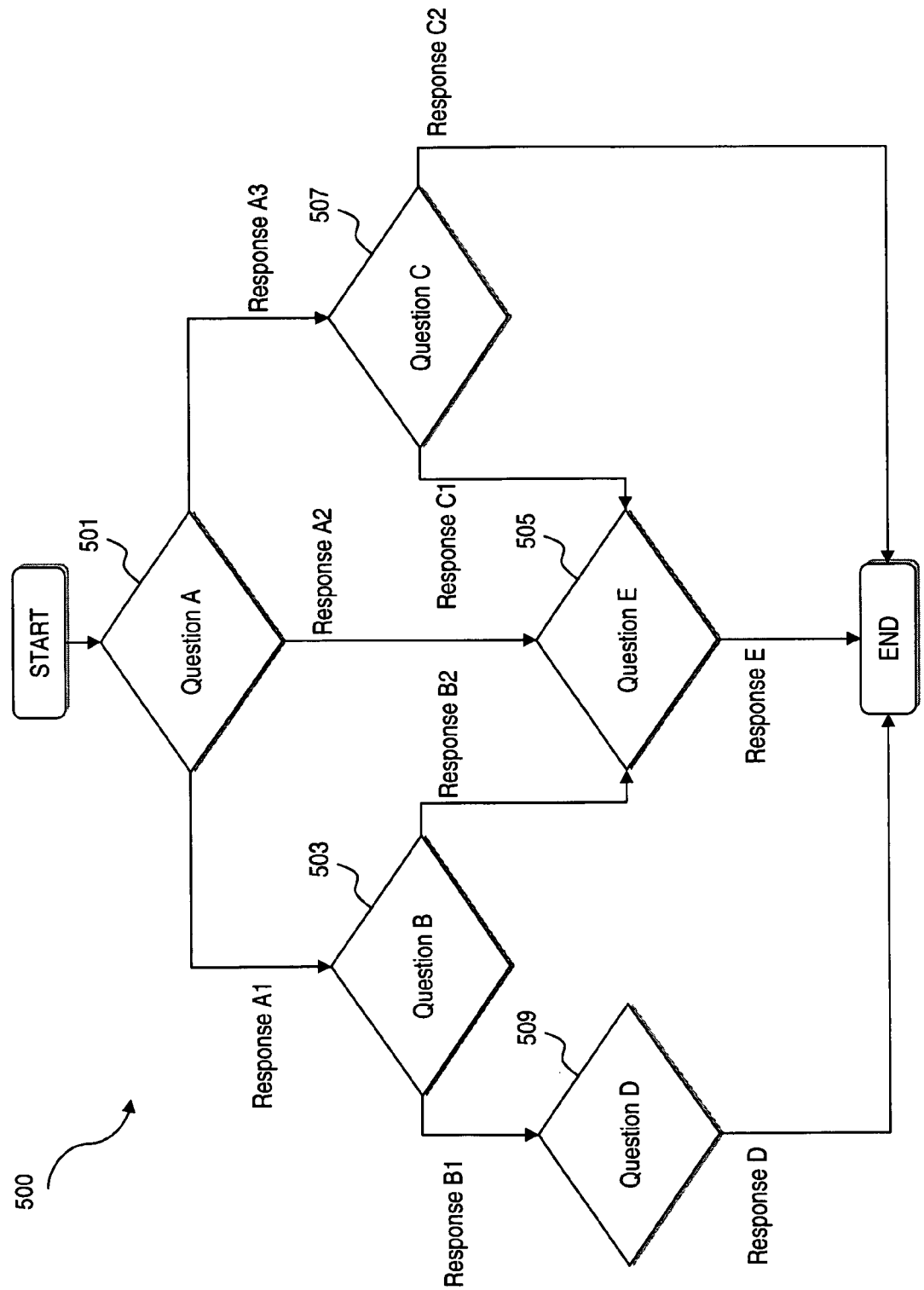
FIG. 5 is a diagram of a dialog providing a speech-enabled web survey application utilizing state files, in accordance with an embodiment of the present invention.

FIG. 5 is a diagram of a dialog providing a speech-enabled web survey application utilizing state files, in accordance with an embodiment of the present invention. Web surveys in general, are useful applications for organizations wanting to positively foster public relations while advantageously impacting their bottom line. In this manner, an organization can setup a series of questions for participants to answer in order to collect pertinent information regarding their business and adapt their methods accordingly. By enabling a configurable speech-enabled web survey, an organization can setup StateMap XML dialog flow control rules that adaptively tailor a generic list of survey questions into a user specific survey controlled by previous answers to the generic questions.

Web survey 500 represents a StateMap XML application including five generic questions each with one to three possible responses. In this manner, each question represents a state within a dialog tied to a VoiceXML file, similar to the construct of FIG. 3. For the purposes of illustration, the web survey 500 specifies five questions and a maximum of three responses of each question, and explained with respect to the system of FIG. 1. It is recognized that the web survey 500 can contain any number or combination of questions and responses.

Once a user 111 establishes a connection to a voice browser 123; in response, the voice browser 123 invokes the StateMap servlet 103. The appropriate StateMap XML file that embodies the configurable speech-enabled web survey 500 can be loaded (e.g., state file 105b). The StateMap sevlet 103 then transitions to initial state 501 corresponding to question A. In this example, question A has three possible replies, Response A1, Response A2 and Response A3. Based on the user's reply, the application transitions to the next appropriate state. If a user 111 responds with response A1, the dialog flow control rules will adaptively modify the survey by asking question B (state 503). However, if the user 111 responds with response A2 or response A3, then the application correspondingly transitions to state 505 (question E) or state 507 (question C) respectively.

Moreover, if user 111 is directed to question B, then user 111 can respond with either response B1 directing the dialog to question D (state 509) or response B2 directing the dialog to question E (state 505). Likewise, if user 111 is directed to question D or question E, it is possible that only one response exists, either response D or response E that respectively ends the dialog, or that any provided user response ends the dialog all together. Similarly, if user 111 is directed to question C, then the user 111 can respond with either response C1 directing the dialog to question E or response C2 that terminates the dialog.

Accordingly, by enabling such a configurable speech-enabled web survey 500 utilizing StateMaps to control dialog flow, generic states can be combined according to user responses to produce a total of five different surveys. Since each survey is user tailored, only those questions pertinent to the user can be asked, thus reducing the time necessary for completion and increasing the likelihood a user will want to participate.

The processes described herein for supporting dynamic human machine interactions may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
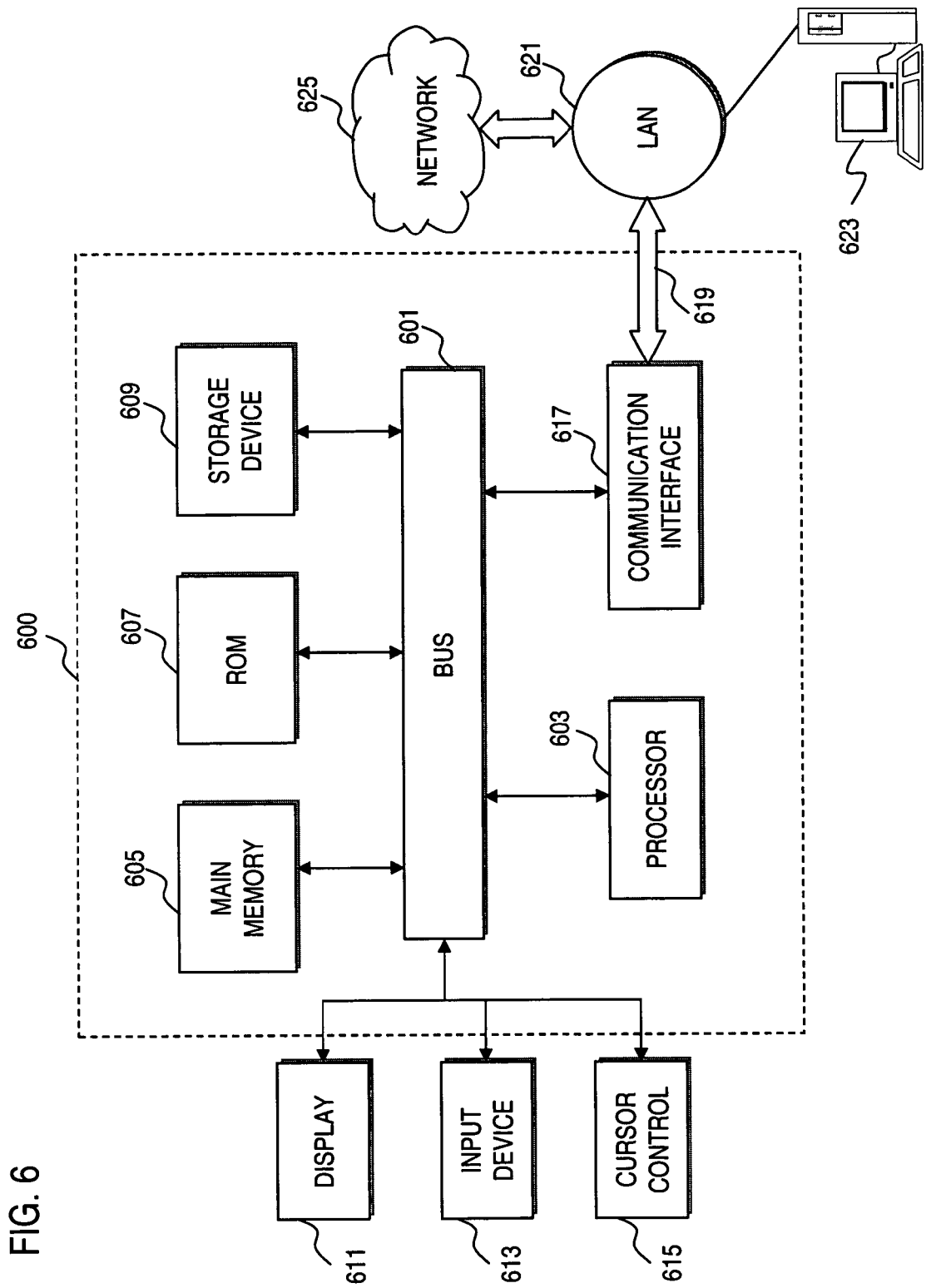
FIG. 6 is a diagram illustrating a computer system that can be used to implement various embodiments of the present invention.

FIG. 6 illustrates a computer system 600 upon which an embodiment according to the present invention can be implemented. For example, the processes described herein can be implemented using the computer system 600. The computer system 600 includes a bus 601 or other communication mechanism for communicating information and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to one embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the present invention. Thus, embodiments of the present invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the present invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the present invention has been described in connection with a number of embodiments and implementations, the present invention is not so limited but covers various obvious modifications and equivalent arrangements, which fall within the purview of the appended claims.

APPENDIX

ANSI American National Standards Institute
ASR Automatic Speech Recognizer
CRT Cathode Ray Tube
CVV Customer's Verification Value
DSL Digital Subscriber Line
DVD Digital Versatile Disc (formerly Digital Video Disc)
EPROM Erasable Programmable Read Only Memory
FPGA Field Programmable Gate Array
GUI Graphical User Interface
HTML HyperText Markup Language
HTTP HyperText Transfer Protocol
IP Internet Protocol
LAN Local Area Network
LDAP Lightweight Directory Access Protocol
PCMCIA Personal Computer Memory Card International Association
PDA Personal Digital Assistant
PROM Programmable Read Only Memory
PSTN Public Switched Telephone Network
RAM Random Access Memory
ROM Read Only Memory
SALT Speech Application Language Tags
TTS Text-to-Speech
URL Uniform Resource Locator
VoiceXML Voice eXtensible Markup Language
VoIP Voice Over IP
W3 World Wide Web Consortium
WAN Wide Area Network
WAP Wireless Application Protocol
WML Wireless Application Protocol
J XML Extensible Markup Language

What is claimed is:

1. A computer-implemented method for interacting with a human user, the method comprising:
   accessing a first state file that specifies a plurality of states of a dialog with the human user, including a global state having applicability to a plurality of applications, and includes logic for transitioning among the states; and
   accessing a second state file that specifies a plurality of states of the dialog and includes logic for transitioning among the states,
   wherein a common process is utilized to interpret the first state file and the second state file, the common process loading one of the state files and determining an appropriate one of a plurality of resources to populate with data associated with the dialog.

2. A method according to claim 1, wherein one of the resources is a mark-up language file specifying instructions for flow of the dialog.

3. A method according to claim 2, wherein the flow is a call flow, and the instructions indicate the call flow within one or more states of the dialog.

4. A method according to claim 2, wherein the mark-up language complies with Voice eXtensible Mark-up Language (VoiceXML).

5. A method according to claim 1, wherein the common process is a servlet configured to interface a browser application.

6. A method according to claim 1, wherein the first state file includes a reference to the second state file for reuse of the second state file.

7. A method according to claim 1, wherein the first state file comprises:
   a preload section for setting up data needed to be passed to a corresponding one of the resources; and
   a postload section for interpreting data passed back from the one corresponding resource and for determining a next dialog state based on the interpreted data.

8. A method according to claim 1, wherein the first state file specifies one of a plurality of modes including a test mode.

9. A method according to claim 1, wherein the first state file specifies one of the states to be a sequence of the states.

10. A system for interacting with a human user, the system comprising:
    a memory configured to store a plurality of state files, each state file specifying a plurality of states of a dialog with the human user, including a global state having applicability to a plurality of applications, and including logic for transitioning among the states; and
    a common processor configured to interpret a first state file and a second state file of the plurality of state files, to load one of the first and second state files, and to determine an appropriate one of a plurality of resources to populate with data associated with the dialog.

11. A system according to claim 10, wherein one of the resources is a mark-up language file specifying instructions for flow of the dialog.

12. A system according to claim 11, wherein the flow is a call flow, and the instructions indicate the call flow within one or more states of the dialog.

13. A system according to claim 11, wherein the mark-up language complies with Voice eXtensible Mark-up Language (VoiceXML).

14. A system according to claim 10, wherein the common processor executes a servlet configured to interface a browser application.

15. A system according to claim 10, wherein the first state file includes a reference to the second state file for reuse of the second state file.

16. A system according to claim 10, wherein the first state file comprises:
    a preload section for setting up data needed to be passed to a corresponding one of the resources; and
    a postload section for interpreting data passed back from the one corresponding resource and for determining a next dialog state based on the interpreted data.

17. A system according to claim 10, wherein the first state file specifies one of a plurality of modes including a test mode.

18. A system according to claim 10, wherein the first state file specifies one of the states to be a sequence of the states.

19. An apparatus for interacting with a human user, the apparatus comprising:
    means for accessing a first state file that specifies a plurality of states of a dialog with the human user, including a global state having applicability to a plurality of applications, and includes logic for transitioning among the states; and
    means for accessing a second state file that specifies a plurality of states of the dialog and includes logic for transitioning among the states,
    wherein a common process is utilized to interpret the first state file and the second state file, the common process loading one of the state files and determining an appropriate one of a plurality of resources to populate with data associated with the dialog.

20. An apparatus according to claim 19, wherein one of the resources is a mark-up language file specifying instructions for flow of the dialog.

21. An apparatus according to claim 20, wherein the flow is a call flow, and the instructions indicate the call flow within one or more states of the dialog.

22. An apparatus according to claim 20, wherein the mark-up language complies with Voice eXtensible Mark-up Language (VoiceXML).

23. An apparatus according to claim 19, wherein the common process is a servlet configured to interface a browser application.

24. An apparatus according to claim 19, wherein the first state file includes a reference to the second state file for reuse of the second state file.

25. An apparatus according to claim 19, wherein the first state file comprises:
    a preload section for setting up data needed to be passed to a corresponding one of the resources; and
    a postload section for interpreting data passed back from the one corresponding resource and for determining a next dialog state based on the interpreted data.

26. An apparatus according to claim 19, wherein the first state file specifies one of a plurality of modes including a test mode.

27. An apparatus according to claim 19, wherein the first state file specifies one of the states to be a sequence of the states.

28. A computer-implemented method for supporting a call flow with a human user, the method comprising:
    receiving a request from a voice browser in support of the call flow; and
    loading one of a plurality of state files in response to the request, wherein the state files correspond to a plurality of states of the call flow and specify rules for the call flow, each of the state files including logic for transitioning among the states, each of the state files being associated with a markup language file specifying a script for the call flow, wherein the markup language file receives data from the respective state file based on state of the call flow; wherein the state files are mark-up language files, and one of the state files specifies a global reusable state.

* * * * *